(12) United States Patent
Okawara et al.

(10) Patent No.: US 8,166,250 B2
(45) Date of Patent: Apr. 24, 2012

(54) INFORMATION PROCESSING UNIT, PROGRAM, AND INSTRUCTION SEQUENCE GENERATION METHOD

(75) Inventors: Hideki Okawara, Kawasaki (JP); Masatoshi Haraguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 665 days.

(21) Appl. No.: 12/334,795

(22) Filed: Dec. 15, 2008

(65) Prior Publication Data
US 2009/0240887 A1 Sep. 24, 2009

(30) Foreign Application Priority Data

Mar. 21, 2008 (JP) ................................. 2008-073863

(51) Int. Cl.
*G06F 12/08* (2006.01)
(52) U.S. Cl. ........................................ 711/137; 711/133
(58) Field of Classification Search ........................ None
See application file for complete search history.

(56) References Cited

U.S. PATENT DOCUMENTS

| | | | |
|---|---|---|---|
| 5,737,565 A * | 4/1998 | Mayfield ....................... | 711/213 |
| 5,944,815 A * | 8/1999 | Witt ............................... | 712/207 |
| 6,460,115 B1 | 10/2002 | Kahle et al. | |
| 6,510,494 B1 | 1/2003 | Arimilli et al. | |
| 6,738,867 B1 | 5/2004 | Kanai | |
| 7,533,242 B1 * | 5/2009 | Moll et al. ..................... | 711/213 |
| 2003/0079089 A1 * | 4/2003 | Barrick et al. ................ | 711/137 |
| 2003/0217230 A1 * | 11/2003 | Rodriguez et al. ............ | 711/136 |
| 2006/0174228 A1 | 8/2006 | Radhakrishnan et al. | |
| 2006/0179238 A1 | 8/2006 | Griswell, Jr. et al. | |
| 2007/0028054 A1 * | 2/2007 | Naryzhny et al. ............. | 711/133 |
| 2007/0294482 A1 * | 12/2007 | Kadambi et al. .............. | 711/137 |
| 2008/0222343 A1 * | 9/2008 | Veazey et al. ..................... | 711/3 |
| 2008/0320228 A1 * | 12/2008 | Brunheroto et al. .......... | 711/137 |
| 2009/0006755 A1 * | 1/2009 | Illikkal et al. ................. | 711/126 |

FOREIGN PATENT DOCUMENTS

| | | |
|---|---|---|
| JP | 11-306028 | 11/1999 |
| JP | 2006-510082 | 3/2006 |
| WO | WO 2004/053686 | 6/2004 |
| WO | WO 2004/055667 | 7/2004 |

OTHER PUBLICATIONS

European Search Report issued Mar. 4, 2010 for corresponding European Patent Application No. 08171949.
European Patent Office Search Report dated Nov. 3, 2009 for corresponding European Patent Application No. 08171949.

* cited by examiner

*Primary Examiner* — Kaushikkumar Patel
(74) *Attorney, Agent, or Firm* — Staas & Halsey LLP

(57) ABSTRACT

An information processing unit includes at least one cache memory provided between an instruction execution section and a storage section and a control section controlling content of address information based on a result of comparison processing between an address requested by a hardware prefetch request issuing section for memory access and address information held in an address information holding section, wherein when the control section causes the address information holding section to hold address information or address information in the address information holding section is updated, overwrite processing on the address information is inhibited for a predetermined time.

15 Claims, 10 Drawing Sheets

FIG. 5

| TIME | ACCESS ADDRESS | ENTRY0 | ENTRY1 | ENTRY2 | ENTRY3 |
|---|---|---|---|---|---|
| t1 | A | A+1 | | | |
| t2 | B | A+1 | B+1 | | |
| t3 | C | A+1 | B+1 | C+1 | |
| t4 | D | A+1 | B+1 | C+1 | D+1 |
| t5 | E | A+2 | B+1 | C+1 | D+1 |
| t6 | A+1 | A+2 | B+2 | C+1 | D+1 |
| t7 | B+1 | A+2 | B+2 | C+2 | D+1 |
| t8 | C+1 | A+2 | B+2 | C+2 | D+2 |
| t9 | D+1 | | | | |

FIG. 7

| TIME | ACCESS ADDRESS | HARDWARE PREFETCH TARGET INDICATION | ENTRY0 | ENTRY1 | ENTRY2 | ENTRY3 |
|---|---|---|---|---|---|---|
| t1 | A | TARGET | A+1 | | | |
| t2 | B | TARGET | A+1 | B+1 | | |
| t3 | C | TARGET | A+1 | B+1 | C+1 | |
| t4 | D | NON-TARGET | A+1 | B+1 | C+1 | |
| t5 | E | NON-TARGET | A+1 | B+1 | C+1 | |
| t6 | A+1 | TARGET | A+2 | B+1 | C+1 | |
| t7 | A+2 | TARGET | A+3 | B+1 | C+1 | |
| t8 | F | NON-TARGET | A+3 | B+1 | C+1 | |
| t9 | B+1 | TARGET | A+3 | B+2 | C+1 | |

→ TIME

FIG. 8

| TIME | ACCESS ADDRESS | HARDWARE PREFETCH TARGET INDICATION | ENTRY0 | ENTRY1 | ENTRY2 | ENTRY3 |
|---|---|---|---|---|---|---|
| t1 | A | TARGET | A+1 | | | |
| t2 | B | TARGET | A+1 | B+1 | | |
| t3 | C | TARGET | A+1 | B+1 | C+1 | |
| t4 | D | NON-TARGET | A+1 | B+1 | C+1 | |
| t5 | D+8 (SOFTWARE PREFETCH) | NON-TARGET | A+1 | B+1 | C+1 | |
| t6 | A+1 | TARGET | A+2 | B+1 | C+1 | |
| t7 | B+1 | TARGET | A+2 | B+2 | C+1 | |
| t8 | C+1 | TARGET | A+2 | B+2 | C+2 | |
| t9 | D+1 | NON-TARGET | A+2 | B+2 | C+2 | |
| t10 | D+9 | NON-TARGET | A+2 | B+2 | C+2 | |

FIG. 10

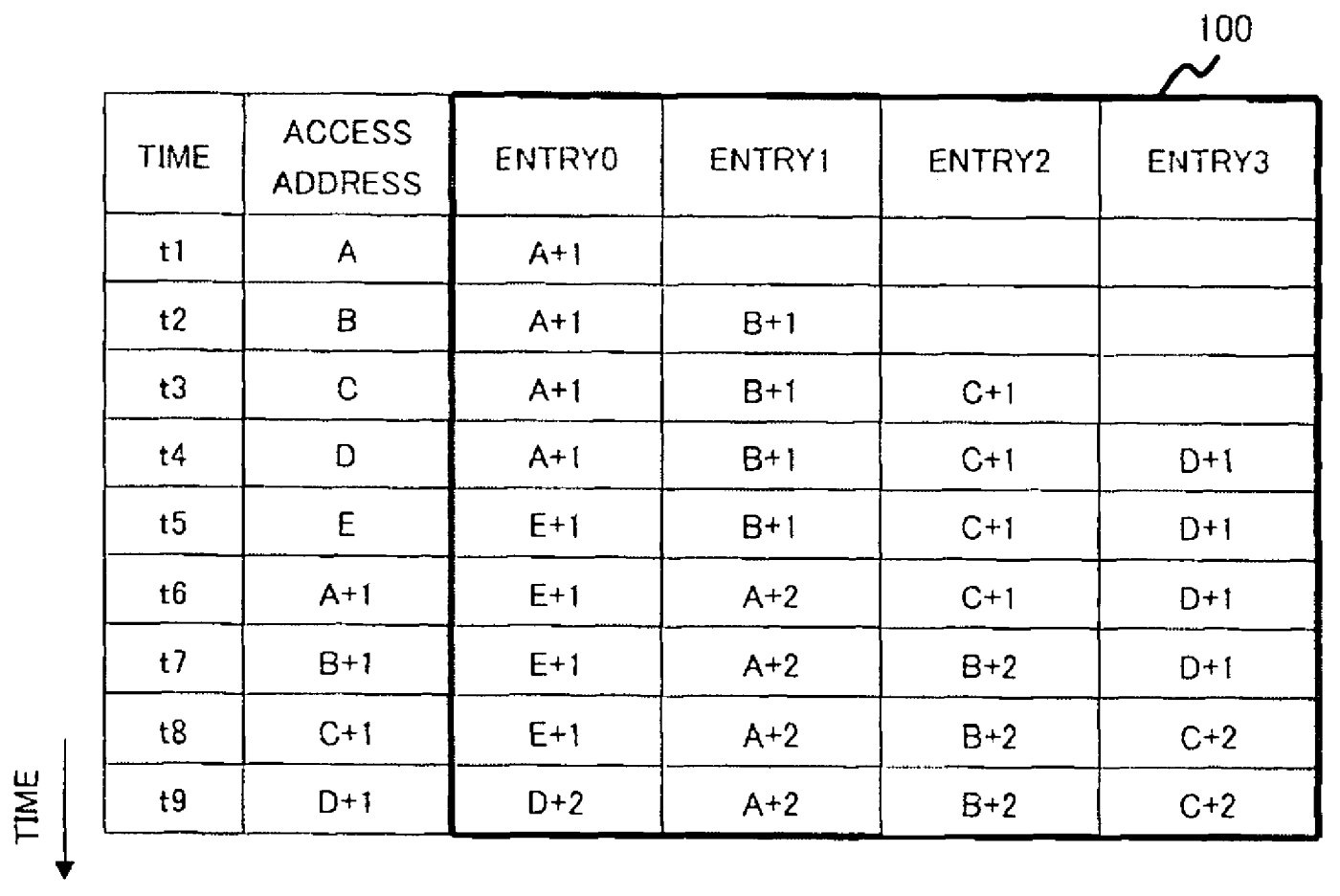

| TIME | ACCESS ADDRESS | ENTRY0 | ENTRY1 | ENTRY2 | ENTRY3 |
|------|----------------|--------|--------|--------|--------|
| t1 | A | A+1 | | | |
| t2 | B | A+1 | B+1 | | |
| t3 | C | A+1 | B+1 | C+1 | |
| t4 | D | A+1 | B+1 | C+1 | D+1 |
| t5 | E | E+1 | B+1 | C+1 | D+1 |
| t6 | A+1 | E+1 | A+2 | C+1 | D+1 |
| t7 | B+1 | E+1 | A+2 | B+2 | D+1 |
| t8 | C+1 | E+1 | A+2 | B+2 | C+2 |
| t9 | D+1 | D+2 | A+2 | B+2 | C+2 |

INFORMATION PROCESSING UNIT, PROGRAM, AND INSTRUCTION SEQUENCE GENERATION METHOD

CROSS-REFERENCE TO RELATED APPLICATION(S)

This application is based upon and claims the benefit of priority of the prior Japanese Application No. 2008-073863, filed on Mar. 21, 2008 in Japan, the entire contents of which are hereby incorporated by reference.

FIELD

The embodiment discussed herein is a technology suitable for use in a prefetch performed in an information processing unit.

BACKGROUND

Conventionally, a computer has at least a one-layer cache memory between a Central Processing Unit (CPU) and a main storage device to hide access latency of the main storage device and improve insufficient throughput.

The rate of performance improvement of a memory system is low compared with speed/performance enhancement of the CPU and thus, in recent years it is becoming increasingly necessary to improve the hit rate of the cache memory and hide cache miss latency.

As a means of solving these problems, a prefetch technique to read data anticipated to be used in the near future into a cache memory in advance is used.

Realization methods of a prefetch can roughly be divided into two methods: a software prefetch by software, and a hardware prefetch by hardware.

In the software prefetch, a prefetch is performed by a prefetch instruction being explicitly inserted into an instruction sequence in advance by a compiler or a programmer.

In the hardware prefetch, on the other hand, address patterns such as memory access addresses and cache miss addresses in the past are stored in a prefetch address queue and when continuous memory access is performed from past address patterns, an anticipated address is prefetched.

Conventionally, regarding the hardware prefetch, a technology to determine a stride value used for the prefetch and a technology about an instruction cache device to prefetch an instruction from the memory for storage in a cache are known (See, for example, Published Japanese Translation of a PCT Application No. 2006-510082, and Japanese Patent Application Laid-Open No. HEI 11-306028.)

In a conventional software prefetch, prefetch instructions are inserted into an instruction sequence in advance, leading to flexible control. However, it is difficult for the software prefetch to insert a necessary prefetch instruction in accordance with dynamic behavior such as an occurrence of cache miss and an address calculation result.

Further, the software prefetch has a problem in that unnecessary redundant prefetch instructions are actually inserted because it is difficult for the software prefetch to insert a necessary minimum single prefetch instruction in units of cache lines in which a prefetch is performed, leading to frequent insertion of a prefetch insertion into all units of cache lines.

In a conventional hardware prefetch, on the other hand, if a plurality of sequences of continuous access exceeding the number of entries that can be recorded as address patterns in a prefetch address queue occurs at the same time, existing entries are overwritten with new address patterns related to continuous access based on LRU (Least Recently Used) control.

However, since the plurality of sequences of continuous access occurs at the same time, overwriting may occur among the plurality of sequences, creating a problem that continuous access cannot be detected so that a hardware prefetch is not generated.

For example, FIG. 10 shows changes of address patterns held in a prefetch address queue 100 by conventional LRU control. The prefetch address queue 100 has four entries of entries 0 to 3 and can record four address patterns.

FIG. 10 also shows changes of address patterns of the prefetch address queue 100 when memory access of five different sequences (here, access addresses A to E) occurs at the same time. Here, the vertical direction in FIG. 10 shows the time.

First, address patterns of sequences A to D are successively registered at times t1 to t4. Here, as a general hardware prefetch mechanism, cache line addresses A+1 to D+1 following the access addresses are registered at the entries 0 to 3 of the prefetch address queue as address patterns respectively.

That is, the address pattern A+1 is registered at the entry 0 in accordance with an occurrence of access of the sequence A at time t1. Also, the address pattern B+1 is registered at the entry 1 in accordance with an occurrence of access of the sequence B at time t2. Further, the address pattern C+1 is registered at the entry 2 in accordance with an occurrence of access of the sequence C at time t3. Then, the address pattern D+1 is registered at the entry 3 in accordance with an occurrence of access of the sequence D at time t4.

Accordingly, all the entries 0 to 3 of the prefetch address queue 100 are used.

When continuous access further proceeds and access of the subsequent sequence E occurs at time t5, the address pattern A+1 of the oldest entry 0 is overwritten by the LRU control to register the address pattern E+1 at the entry 0.

Then, when continuous access of the sequence A occurs at time t6, the address pattern A+1 registered till time t4 at the entry 0 has been deleted by being overwritten at time t5. Thus, even if continuous access of the sequence A occurs at this point, a prefetch request of the sequence A cannot be issued.

Then, at this point, overwrite processing of the address pattern B+1 of entry 1 is performed with the address pattern A+2.

Henceforth, as shown in FIG. 10, like the sequence A, even if continuous access of the sequences B to D occurs at times t7 to t9, prefetch requests of the sequences B to D cannot be issued either.

According to the conventional LRU control, as described above, if access of more sequences than the number of entries of the prefetch address queue 100 occurs at the same time, address patterns of respective sequences are mutually overwritten in the prefetch address queue 100. As a result, a problem arises in that a prefetch request cannot be issued.

Moreover, the hardware prefetch operates according to an algorithm implemented as a circuit and thus, timing of performing a prefetch and a prefetch distance between the access address and an address of data to be prefetched are fixed, leading to less flexible control than that of the software prefetch.

Further, the hardware prefetch is conventionally invisible to compilers and programmers and thus, the hardware prefetch and software prefetch are optimized independently. Therefore, there is a problem of less efficient optimization such as the same address being prefetched by both the hardware prefetch and software prefetch.

SUMMARY

The present invention has been developed in view of the above problem and an object thereof is to enable an effective performance improvement by a prefetch.

To achieve the above object, the present information processing unit includes at least one cache memory provided between an instruction execution section and a storage section and a control section controlling content of address information based on a result of comparison processing between an address requested by a hardware prefetch request issuing section for memory access and address information held in an address information holding section, wherein when the control section causes the address information holding section to hold address information or when address information in the address information holding section is updated, overwrite processing on the address information is inhibited for a predetermined time.

Also, to achieve the above object, the present information processing unit includes a hardware prefetch target indication section that attaches indication information, which indicates whether or not the memory access instruction is a hardware prefetch request issuance target by the hardware prefetch request issuing section, to a memory access instruction, wherein the hardware prefetch request issuing section performs comparison processing and issuance processing of a hardware prefetch request based on the indication information.

Also, to achieve the above object, a program thereof is required to cause a computer to function as the hardware prefetch target indication section.

Further, to achieve the above object, an instruction sequence generation method thereof attaches indication information, which indicates whether or not the memory access instruction is a hardware prefetch request issuance target by the hardware prefetch request issuing section, to a memory access instruction in accordance with the number of entries of address information that can be held by the address information holding section, and inhibits generation of a software prefetch instruction related to a memory access instruction, to which indication information indicating a hardware prefetch request issuance target is attached, while a software prefetch instruction related to a memory access instruction, to which indication information indicating not a hardware prefetch request issuance target is attached, is generated to be inserted into an instruction sequence.

According to the above information processing unit, as described above, when the address information holding section is caused to hold address information or address information in the address information holding section is updated, the control section inhibits overwrite processing on the address information for a predetermined period. Thus, valid address information for which continuous access is identified can be inhibited from being deleted by overwrite processing, like conventional LRU control, immediately after being registered or updated. That is, even if continuous access of a plurality of sequences exceeding the number of entries should occur, registered address information can reliably be prevented from being mutually overwritten by memory access of the plurality of sequences. As a result, the address information holding section can be used effectively and a prefetch request to continuous access can be issued efficiently so that effective performance improvement of the present information processing unit can be achieved by a prefetch.

Also, according to the above program and instruction sequence generation method, since the prefetch target indication section attaches indication information, which indicates whether or not the memory access instruction is a prefetch request issuance target, to a memory access instruction, whether or not to cause a hardware prefetch to perform can be determined from the software prefetch side so that the software prefetch and hardware prefetch can be made consistent with efficiency. As a result, effective performance improvement can be achieved by a prefetch.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 5 is a diagram showing an example of changes of address patterns held in the prefetch address queue when continuous access exceeding the number of entries of the prefetch address queue in the hardware prefetch control device of the information processing unit as an embodiment occurs;

FIG. 7 shows an example of changes of address patterns held in the prefetch address queue in the hardware prefetch control device of the information processing unit as an embodiment;

FIG. 8 shows an example of changes of address patterns held in the prefetch address queue in the hardware prefetch control device of the information processing unit as an embodiment;

FIG. 10 shows changes of address patterns held in the prefetch address queue by conventional LRU control.

DESCRIPTION OF THE EMBODIMENTS

Embodiments will be described below with reference to drawings.

[1] An Embodiment

First, the configuration of an information processing unit 1 as an embodiment of the present invention will be described with reference to the functional block diagram shown in FIG. 1.

Figure 1:
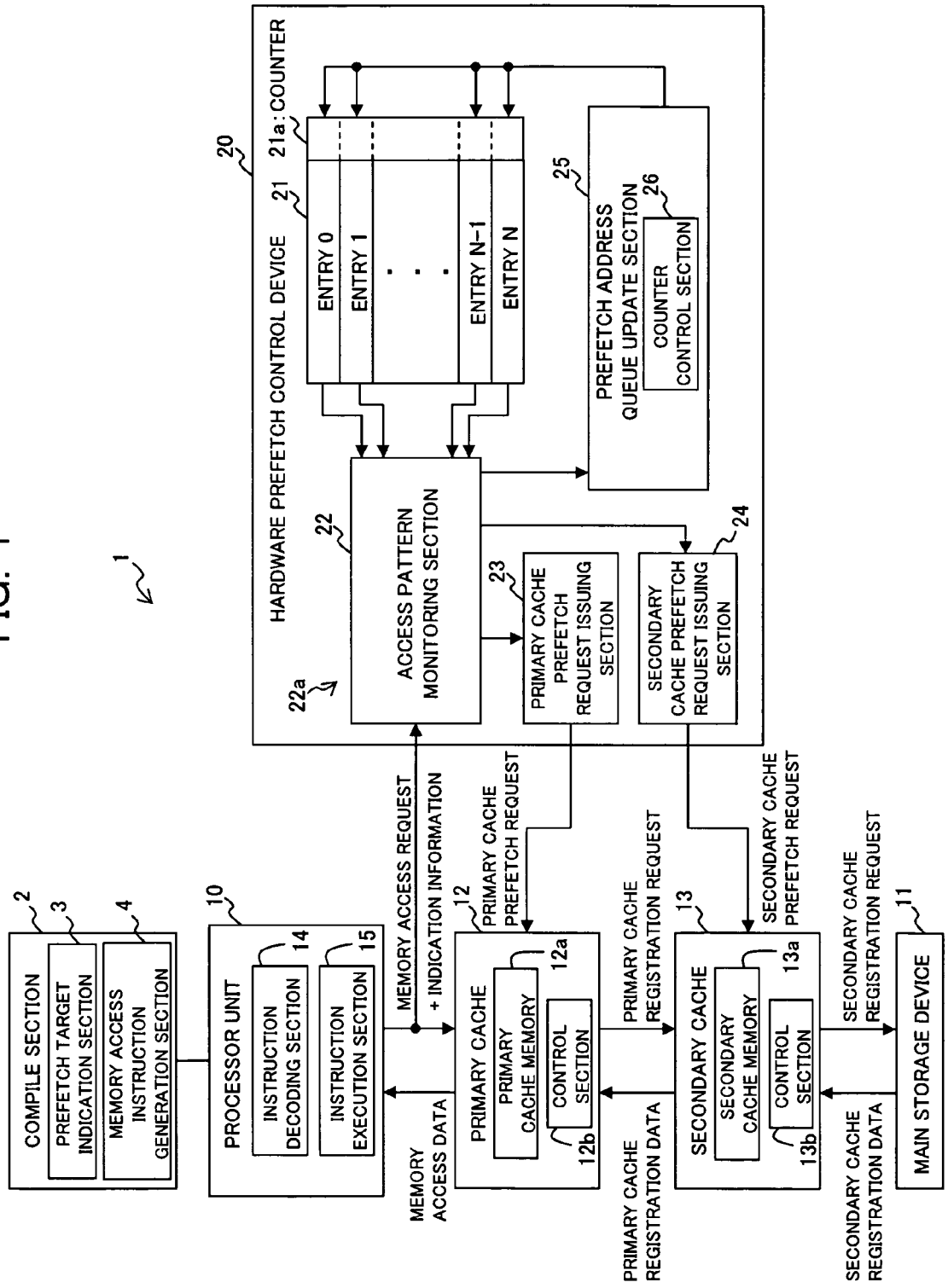
FIG. 1 is a block diagram showing the configuration of an information processing unit as an embodiment.

As shown in FIG. 1, the information processing unit 1 has a compile section 2, a processor unit (instruction issuing section/instruction execution section) 10, a main storage device (storage section) 11, a primary cache 12, a secondary cache 13, and a hardware prefetch control device 20. The information processing unit 1 has a program instruction sequence generated by a compiler as input and the program is executed by the instruction issuing section/instruction execution section 10.

The compile section 2 is realized by a compiler and converts source code written in a programming language into an executable form by the processor unit 10.

Figure 2:
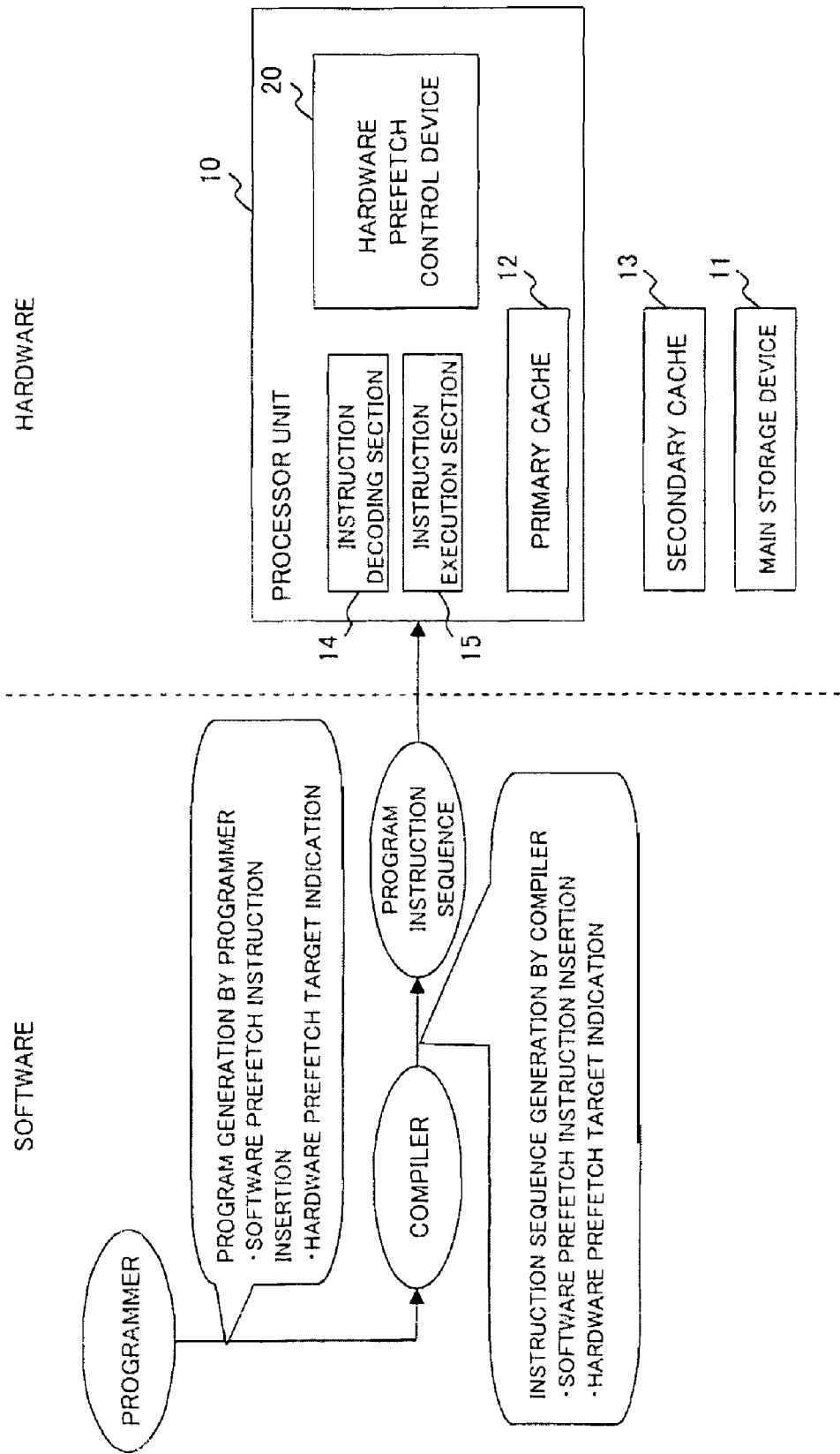
FIG. 2 is a diagram illustrating the configuration of the information processing unit as an embodiment.

As shown in FIG. 2, the compiler is software, and after a program is generated by a programmer, a program instruction sequence is generated by the compile section 2 realized by a compiler.

Program generation by a programmer may include generation/insertion of software prefetch instructions and hardware prefetch target indications described later.

Instruction sequence generation processing by the compile section 2 includes hardware prefetch target indications by a prefetch target indication section (hardware prefetch target indication section) 3 possessed by the compile section 2 and software prefetch instruction insertion processing by a memory access instruction generation section 4 possessed by the compile section 2.

In this manner, a software prefetch is realized by the compile section 2.

In contrast to the compiler, which is software, the processor unit 10, the main storage device 11, a primary cache memory 12a, a secondary cache memory 13a, and the hardware prefetch control device 20 are hardware.

The example in FIG. 2 is an example in which the primary cache memory 12a (that is, the primary cache 12) and the hardware prefetch control device 20 are provided inside the processor unit 10, but in the present invention, the location where the primary cache 12, the secondary cache 13, and the hardware prefetch control device 20 are provided is not limited.

When the prefetch target indication section 3 recognizes continuous access based on a converted instruction sequence, the prefetch target indication section 3 determines whether or not to perform a prefetch based on the hardware prefetch for a memory access instruction causing the continuous access.

That is, the prefetch target indication section 3 determines whether or not the memory access instruction causing the continuous access is a hardware prefetch request issuance target (hereinafter, referred to as a prefetch request issuance target) by a hardware prefetch request issuing section 22a, described later, of the hardware prefetch control device 20. Then, the prefetch target indication section 3 attaches indication information (hardware prefetch target indication), which indicates whether or not the memory access instruction is a prefetch request issuance target by the hardware prefetch request issuing section 22a, to the memory access instruction.

That is, the indication information is information indicating whether or not to cause the hardware prefetch request issuing section 22a to issue a hardware prefetch request.

The memory access instruction generation section 4 generates a software prefetch instruction related to a memory access instruction causing continuous access and inserts the software prefetch instruction into an instruction sequence. The compile section 2 outputs an instruction sequence into which a software prefetch instruction generated by the memory access instruction generation section is inserted as memory access instructions.

More specifically, the memory access instruction generation section 4 inhibits generation of a software prefetch instruction related to a memory access instruction to which indication information, which indicates a prefetch request issuance target, is attached by the prefetch target indication section 3.

On the other hand, the memory access instruction generation section 4 generates a software prefetch instruction to perform a software prefetch for a memory access instruction determined by the prefetch target indication section 3 to cause continuous access and to which indication information, which indicates not a prefetch request issuance target (that is, a prefetch issue non-target), is attached and inserts the software prefetch instruction into an instruction sequence.

The processor unit 10 performs computation processing and has an instruction decoding section 14 and an instruction execution section 15.

The instruction decoding section 14 decodes a program instruction sequence (or simply called an instruction sequence) generated by the compile section 2 into an executable form by the instruction execution section 15.

The instruction execution section 15 executes a memory access instruction decoded by the instruction decoding section 14 and makes a memory access request to the primary cache 12. In a description that follows, a memory access request address related to the memory access request will be called an access address.

A memory access request (access address) from the instruction execution section 15 to the primary cache 12 is also input to an access pattern monitoring section 22 described later of the hardware prefetch control device 20 together with hardware prefetch target indications attached by the prefetch target indication section 3.

The main storage device 11 stores data related to a memory access instruction executed by the instruction execution section 15.

The primary cache 12 has the primary cache memory 12a whose access speed is fast and a control device 12b thereof. The control unit of the primary cache 12 is, for example, 64 B (bytes).

The secondary cache 13 has the secondary cache memory 13a, whose access speed is faster than that of the main storage device 11 and which has a larger capacity than that of the primary cache memory 12a of the primary cache 12, and a control device 13b thereof. The control unit of the secondary cache 13 is, for example, 256 B.

In response to a memory access request from the processor unit 10, the primary cache 12 outputs data of the access address to the processor unit as fetch data if the primary cache 12 holds the data (See "Memory access data" in FIG. 1).

If, on the other hand, the primary cache 12 does not hold the data of the access address, the primary cache 12 requests the data from the secondary cache 13 (See "Primary cache registration request" in FIG. 1).

If the secondary cache 13 holds the data requested by the primary cache 12, the secondary cache 13 responds to the primary cache 12 with the data (See "Primary cache registration data" in FIG. 1).

However, if the secondary cache 13 does not hold the requested data, the secondary cache 13 requests the data from the main storage device 11 (See "Secondary cache registration request" in FIG. 1). Then, the main storage device 11 responds to the secondary cache 13 with the data (See "Secondary cache registration data" in FIG. 1).

Then, the data is output to the processor unit 10 from the main storage device 11 via the secondary cache 13 and the primary cache 12.

The hardware prefetch control device 20 detects continuous access based on a result of comparison processing of registered past address patterns and the access address of the subsequent memory access instruction to issue a hardware prefetch request of a cache block.

Then, the hardware prefetch control device 20 has a prefetch address queue (address information holding section) 21, the access pattern monitoring section 22, a primary cache prefetch request issuing section 23, a secondary cache prefetch request issuing section 24, and a prefetch address queue update section (control section) 25.

The prefetch address queue 21 holds address patterns (address information) based on the access address of a memory access instruction executed by the instruction execution section 15.

Here, the prefetch address queue 21 has (N+1) entries at entries 0 to N and holds the cache line address following the access address, for example, at each of the entries 0 to N as address information.

Content of the prefetch address queue 21 is controlled by the prefetch address queue update section 25.

The prefetch address queue 21 also has a flag to indicate whether an address pattern is registered at each of the entries 0 to N.

Further, the prefetch address queue 21 has a plurality of counters 21a-0 to N (shown as numeral 21a in FIG. 1) corresponding to each of the plurality of entries 0 to N.

The counters 21a-0 to N (hereinafter, simply called the counter 21a when not specifically distinguished) count the number of clock cycles after an address pattern is newly held or updated for each of the plurality of entries 0 to N.

Here, the clock cycle is a clock cycle of the information processing unit 1 (for example, the processor unit 10).

The access pattern monitoring section 22 performs comparison processing of the access address to which a memory access request is made from the instruction execution section 15 of the processor unit 10 and address patterns held in the prefetch address queue 21.

Here, if indication information indicates the memory access request is a prefetch request issuance target, the access pattern monitoring section 22 performs the above comparison processing based on the indication information attached to the memory access request.

However, if indication information indicates the memory access request is not a prefetch request issuance target, the access pattern monitoring section 22 does not perform the above comparison processing. That is, in this case, the access pattern monitoring section 22 inhibits prefetch request issue processing by inhibiting execution of the comparison processing.

Therefore, the hardware prefetch control device 20 does not operate in response to a memory access request whose indication information indicates the memory access request is not a prefetch request issuance target.

Then, if the access address and address patterns held in the prefetch address queue 21 match as a result of the comparison processing, the access pattern monitoring section 22 causes the primary cache prefetch request issuing section 23 or the secondary cache prefetch request issuing section 24 to issue a prefetch request.

That is, if, as a result of comparison processing, an adjacent address was accessed in the past (namely, the address pattern is registered in the prefetch address queue 21) and continuous access in progress is detected, the access pattern monitoring section 22 assumes that continuous access further proceeds in the near future and causes a prefetch request issuing section to issue a prefetch request.

Whether to cause the primary cache prefetch request issuing section 23 or the secondary cache prefetch request issuing section 24 to issue a prefetch request is not limited in the present invention and is decided, for example, by specifications of the hardware prefetch control device 20.

The primary cache prefetch request issuing section 23 issues a prefetch request to the primary cache 12 in accordance with instructions from the access pattern monitoring section 22.

More specifically, the primary cache prefetch request issuing section 23 issues a request to cause the primary cache 12 to prefetch an address pattern, that is, 1-block data of the cache line following the access address.

The number of blocks requested for a prefetch by the primary cache prefetch request issuing section 23 or the secondary cache prefetch request issuing section 24 and a prefetch distance between the access address and an address of the cache line to be prefetched are not limited in the present invention and are decided, for example, by specifications of the hardware prefetch control device 20.

The secondary cache prefetch request issuing section 24 issues a prefetch request to the secondary cache 13 in accordance with instructions from the access pattern monitoring section 22.

Here, like the primary cache prefetch request issuing section 23, the secondary cache prefetch request issuing section 24 prefetches data of the cache line following the access address.

Thus, the access pattern monitoring section 22, the primary cache prefetch request issuing section 23, and the secondary cache prefetch request issuing section 24 function as the hardware prefetch request issuing section 22a issuing a prefetch request to the primary cache 12 or the secondary cache 13 based on a result of comparison processing of the access address to which a memory access request is made from the instruction execution section 15 and address patterns held in the prefetch address queue 21.

The prefetch address queue update section 25 (hereinafter, simply called the update section 25) updates and controls content of address patterns held in the prefetch address queue 21 based on a result of comparison processing by the access pattern monitoring section 22.

More specifically, if, as a result of comparison processing by the access pattern monitoring section 22, an access address is found not to be registered in the prefetch address queue 21, the update section 25 newly registers an address pattern based on the access address into the prefetch address queue 21.

However, new registration assumes that indication information, which indicates not a prefetch issue target, is not attached to the access address and further, empty entries 0 to N that can be registered in the prefetch address queue 21 or entries 0 to N that can be overwritten are present.

On the other hand, if, as a result of comparison processing by the access pattern monitoring section 22, an access pattern is found to be registered in the prefetch address queue 21, the update section 25 sets content of the address pattern to the address of the next cache line for update.

If the update section 25 causes the prefetch address queue 21 to hold (that is, newly registers) an address pattern or updates content of an address pattern in the prefetch address queue 21, the update part 25 inhibits overwrite processing on the address pattern for a predetermined period.

Here, the update section 25 recognizes, as the predetermined period, that the value of the counter 21a corresponding to each of the entries 0 to N at which the address pattern is registered takes a predetermined value and inhibits registration of another address pattern by deleting the address pattern at each of the entries 0 to N until the value of the counter 21a takes the predetermined value.

Details of control processing by the update section 25 will be described with reference to FIG. 4 described later.

Further, the update section 25 has a counter control section 26 to control the counter 21a of the prefetch address queue 21.

When address patterns are held at the entries 0 to N, the counter control section 26 counts up the value of the corresponding counter 21a one by one in accordance with the system clock.

When a new address pattern is registered at any one of the entries 0 to N or an address pattern held at any one of the entries 0 to N is updated, the counter control section 26 resets the value of the corresponding counter 21a to 0.

Figure 3:
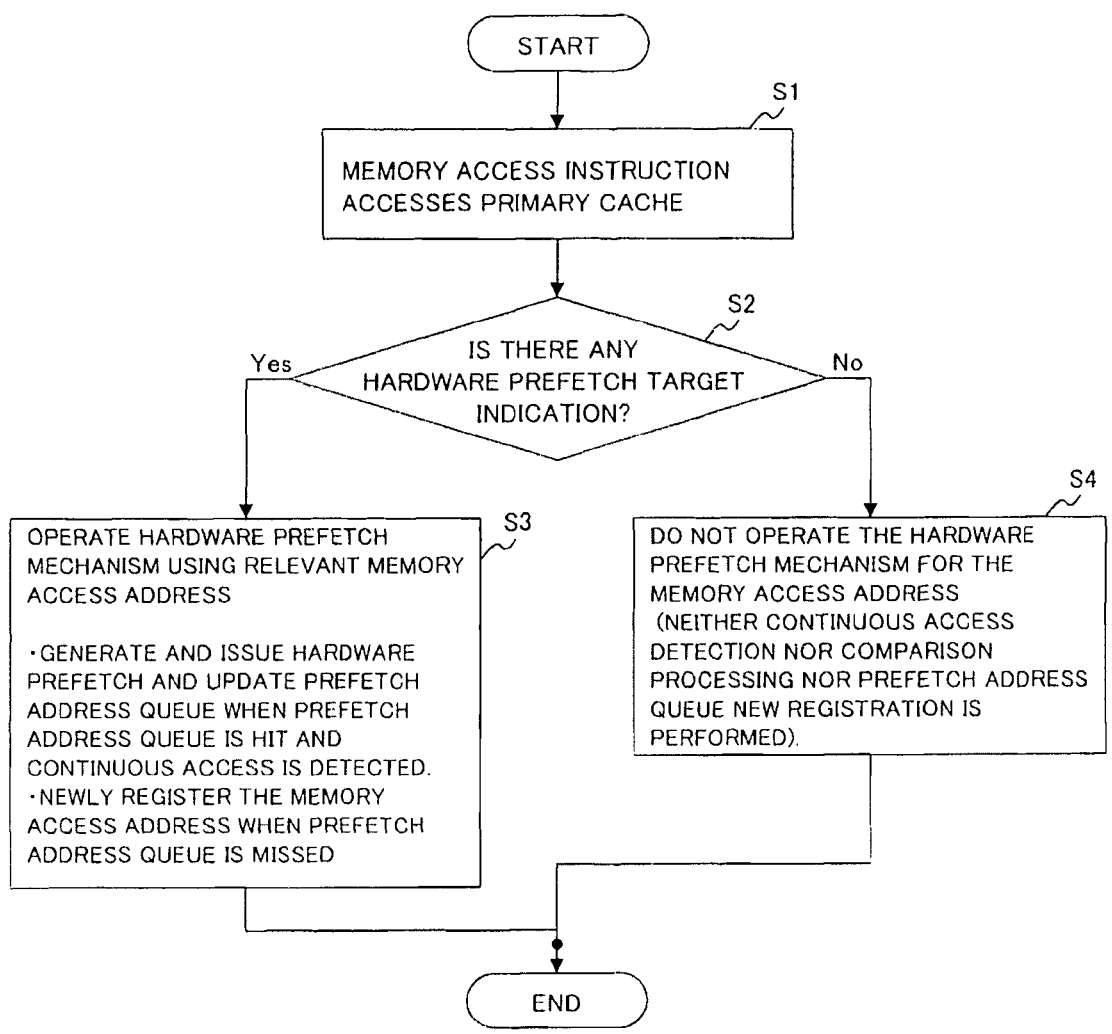
FIG. 3 is a flow chart exemplifying an operation procedure for a hardware prefetch control device of the information processing unit as an embodiment.

Here, an overview of the operation procedure for the hardware prefetch control device 20 will be provided with reference to the flow chart (steps S1 to S4) shown in FIG. 3.

First, when a memory access instruction from the instruction execution section 15 of the processor unit 10 accesses the primary cache (step S1), the access pattern monitoring section 22 of the hardware prefetch control device 20 determines whether or not indication information attached to the memory access instruction is a hardware prefetch target indication (step S2). That is, the access pattern monitoring section 22 determines whether or not the indication information indicates a prefetch request issuance target.

Here, if the access pattern monitoring section 22 determines that the memory access instruction contains a hardware prefetch target indication (Yes route at step S2), the hardware prefetch control device 20 uses the memory access address to operate the hardware prefetch mechanism according to a procedure shown in FIG. 4 described later (step S3).

That is, the access pattern monitoring section 22 detects continuous access by performing comparison processing and the hardware prefetch mechanism issues a prefetch and updates the prefetch address queue 21.

On the other hand, if, as a result of comparison processing by the access pattern monitoring section 22, a hit error occurs in the prefetch address queue 21, the memory access address is newly registered in the prefetch address queue 21.

In contrast, if the access pattern monitoring section 22 determines that the memory access instruction does not contain a hardware prefetch target indication (No route at step S2), the hardware prefetch control device 20 does not operate the hardware prefetch mechanism for the memory access address (step S4).

That is, neither comparison processing by the access pattern monitoring section 22 nor new registration/update processing in the prefetch address queue 21 are performed.

Next, the processing procedure for the update section 25 will be described with reference to the flow chart (steps S10 to S18) shown in FIG. 4.

First, when a new registration request of an address pattern regarding a memory access request of a hardware prefetch operation target arises in accordance with a comparison result by the access pattern monitoring section 22 and indication information, the update section 25 determines whether or not there is any invalid entry, that is, any entry at which no address pattern is registered, in the entries 0 to N based on the flag of each of entries 0 to N of the prefetch address queue 21 (step S11).

Here, if the update section 25 determines that there is no invalid entry (No route at step S11), the update section 25 next determines whether or not there is any entry, at which overwrite processing is not inhibited (prohibited), in the entries 0 to N (step S12). That is, here, the update section 25 determines whether or not there is any entry whose counter 21a has a predetermined value.

Then, if there is no entry at which overwrite processing is not prohibited (No route at step S12), the update section 25 does not newly register the address pattern related to the memory access request for which a new registration request arose (step S13) and terminates processing.

That is, since the value of the counter 21a has not reached a predetermined value, the update section 25 inhibits overwrite processing on address patterns at the entries 0 to N.

If, on the other hand, there is any entry at which overwrite processing is not prohibited (Yes route at step S12), the update section 25 selects one entry from the entries 0 to N at which overwrite processing can be performed and newly registers the address pattern by overwrite processing (step S14).

If, at this point, there is a plurality of the entries, of which the counter 21a has the same value, in the entries 0 to N, the update section 25 selects, for example, the oldest entry of the plurality of the entries for overwrite processing.

Then, after overwrite processing of the new address pattern by the update section 25 is performed, the counter control section 26 sets (resets) the value of the counter 21a corresponding to the overwritten entry to 0 (step S15). Subsequently, the counter control section 26 adds 1 to the counter in each cycle (step S15).

If, at step S11, there is any invalid entry in the entries 0 to N (Yes route at step S11), the update section 25 selects the invalid entry and registers the address pattern related to the access address for which a new registration request arose (step S16).

Then, the counter control section 26 resets the value of the counter 21a corresponding to the invalid entry to 0 and subsequently adds 1 to the counter in each cycle (step S15).

If continuous access is detected by matching results of comparison processing by the access pattern monitoring section 22 in memory access showing a hardware prefetch operation target, that is, a prefetch issue target is indicated by indication information (step S17), the access pattern monitoring section 22 issues a hardware prefetch of the next cache line to the primary cache prefetch request issuing section 23 or the secondary cache prefetch request issuing section 24. At this point, the update section 25 further updates the address pattern at the corresponding entry (step S18).

Then, the counter control section 26 resets the value of the counter 21a of the corresponding entry to 0 and subsequently adds 1 to the counter in each cycle (step S15).

Here, FIG. 5 shows an example of address patterns held in the prefetch address queue 21 when continuous access exceeding the number of entries (maximum number of entries) in the prefetch address queue 21 occurs.

In examples shown in FIG. 5 and FIGS. 7 and 8 described later, it is assumed that the prefetch address queue 21 has four entries of entries 0 to 3 so that four address patterns can be recorded. The vertical direction in FIG. 5 and FIGS. 7 and 8 described later shows the time.

First, when memory access requests arise to access addresses A to D at times t1 to t4, address patterns of these sequences A to D are successively registered. Here, as a hardware prefetch mechanism, cache line addresses A+1 to D+1 following the access addresses are registered at the entries 0 to 3 of the prefetch address queue as address patterns respectively.

That is, the update section 25 newly registers the address pattern A+1 at the entry 0 in accordance with an occurrence of access of the sequence A at time t1. Also, the update section 25 newly registers the address pattern B+1 at the entry 1 in accordance with an occurrence of access of the sequence B at time t2. Further, the update section 25 newly registers the address pattern C+1 at the entry 2 in accordance with an occurrence of access of the sequence C at time t3. Then, the update section 25 newly registers the address pattern D+1 at the entry 3 in accordance with an occurrence of access of the sequence D at time t4.

Accordingly, all the entries 0 to 3 of the prefetch address queue 21 are used.

Figure 4:
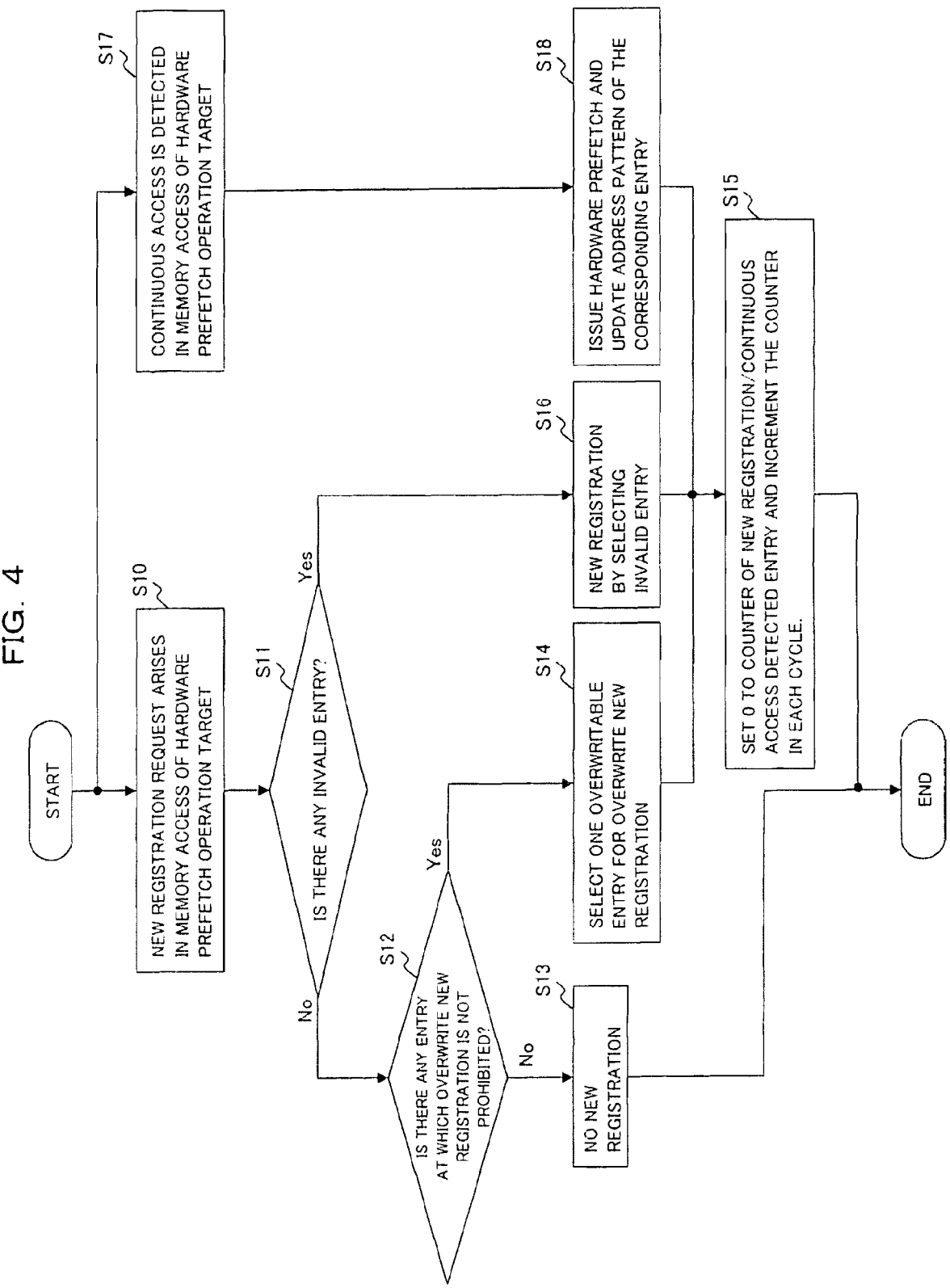
FIG. 4 is a flow chart exemplifying the operation procedure for a prefetch address queue update section of the hardware prefetch control device of the information processing unit as an embodiment.

Next, when a memory access request to an access address E arises at time t5, the update section 25 performs processing in the order of steps S10, S11, S12, and S13 in FIG. 4 and inhibits overwrite processing on entries at the entries 0 to 3 in the end so that the address pattern of the sequence E is not newly registered.

That is, the counters 21a corresponding to the entries 0 to 3 show "4", "3", "2", and "1" at time t5 respectively and a predetermined value "8" is not reached so that the update section 25 inhibits overwrite processing.

Subsequently, when memory access requests arise to the access addresses A+1 to D+1 at times t6 to t9, a prefetch request of addresses A+2 to D+2 is made at each of times t6 to t9 by the access pattern monitoring section 22, the primary cache prefetch request issuing section 23, or the secondary cache prefetch request issuing section 24.

Then, the update section 25 performs update processing to register these addresses A+2 to D+2 at the corresponding entries 0 to 3 as address patterns.

Figure 6:
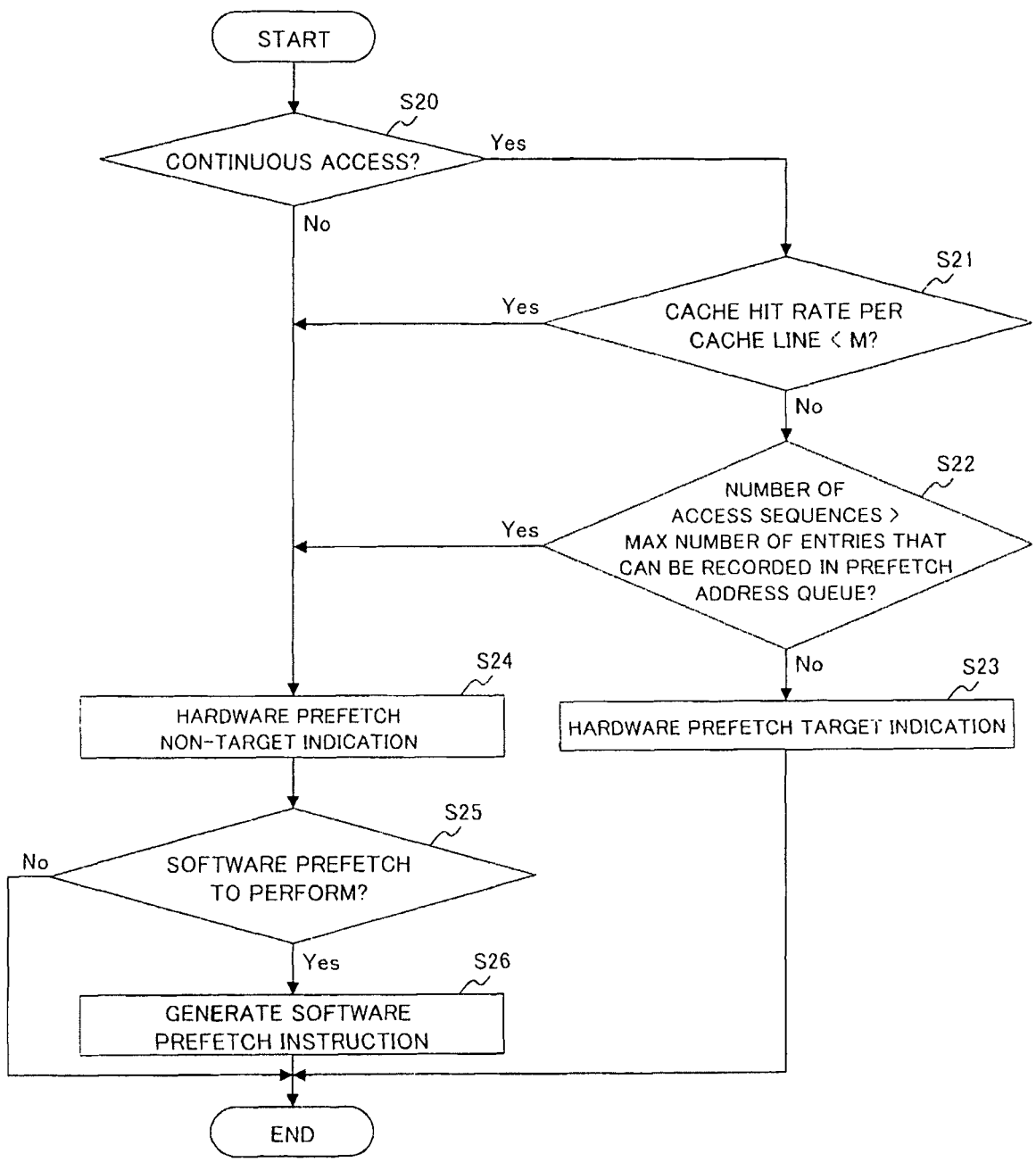
FIG. 6 is a flow chart exemplifying the operation procedure for a compile section of a processor unit of the information processing unit as an embodiment.

Next, an example of the operation procedure of the compile section 2 (the prefetch target indication section 3 and the memory access instruction generation section 4) will be described with reference to the flow chart (steps S20 to S26) shown in FIG. 6.

First, the prefetch target indication section 3 of the compile section 2 determines whether or not compiled memory access instructions are continuous access (step S20).

Here, if the prefetch target indication section 3 determines that memory access instructions are continuous access (Yes route at step S20), the prefetch target indication section 3 next determines whether or not the cache hit rate per cache line is equal to or less than a preset predetermined value M (step S21). The predetermined value M depends on hardware (the CPU and the like).

The cache hit rate can be determined by the following formula (1):

$$\text{Cache hit rate} = [\text{number of cache hits}]/[\text{max. number of cache hits}] \times 100 \quad (1)$$

The number of cache hits shows how many times the cache hit occurs while a loop makes a rotation and is determined by the following formula (2), and the max. number of cache hits is determined by the following formula (3):

$$\text{Number of cache hits} = [\text{size of one cache line}]/[\text{update width per loop rotation}] \quad (2)$$

$$\text{Max. number of cache hits} = [\text{size of one cache line}]/[\text{memory access type}] \quad (3)$$

Then, if the cache hit rate is equal to or larger than the predetermined value M (No route at step S21), the prefetch target indication section 3 determines whether or not the number of access sequences causing continuous access at the same time is equal to or greater than the max. number of entries (Here N) that can be recorded by the prefetch address queue 21 (step S22). Causing continuous access at the same time here does not mean that memory access occurs exactly at the same time, but access sequences are compiled by the compile section 2 in the same time period and continuous access is detected.

Then, if the number of access sequences is equal to or less than the max. number of entries of the prefetch address queue 21 (No route at step S22), the prefetch target indication section 3 determines that the memory access instruction is a hardware prefetch target and attaches indication information, which indicates a prefetch request issuance target, to the memory access instruction (step S23). The prefetch target indication section 3 thereby indicates the memory access instruction to be a hardware prefetch target before terminating processing.

On the other hand, if the prefetch target indication section 3 determines at step S21 that the cache hit rate is smaller than M (Yes route at step S21) or at step S22 that the number of access sequences occurring at the same time is greater than the max. number of entries of the prefetch address queue 21 (Yes route at step S22), the prefetch target indication section 3 indicates the memory access instruction to be a hardware prefetch non-target (step S24).

That is, in these cases, the prefetch target indication section 3 attaches indication information, which indicates not a prefetch request issuance target, to the memory access instruction.

Further, the prefetch target indication section 3 attaches indication information, which indicates not a prefetch request issuance target, to a memory access instruction determined at step S20 not to be continuous access (No route at step S20) (step S24).

However, if it is unknown whether or not a memory access instruction is continuous access, the prefetch target indication section 3 may provide a hardware prefetch non-target indication at step S24 or a hardware prefetch target indication (step S23).

Next, the prefetch target indication section 3 determines whether or not to perform a software prefetch for a memory access instruction to which a hardware prefetch non-target indication is provided at step S24 (step S25).

Then, if the prefetch target indication section 3 determines to perform a software prefetch (Yes route at step S25), the memory access instruction generation section 4 generates a software prefetch instruction for the memory access instruction and inserts the software prefetch instruction into an instruction sequence (step S26) before terminating processing.

On the other hand, if the prefetch target indication section 3 determines not to perform a software prefetch (No route at step S25), the memory access instruction generation section 4 terminates processing without performing processing at step S26.

The memory access instruction generation section 4 inhibits generation of a software prefetch instruction for a memory access instruction to which a hardware prefetch target indication is provided at step S23.

Thus, when continuous access of a plurality of sequences occurs at the same time, the prefetch target indication section 3 of the compile section 2 attaches indication information in accordance with the number of entries N+1 of address patterns that can be held by the prefetch address queue 21.

More specifically, if the number of sequences of instructions causing continuous access at the same time exceeds the number of entries N+1, the prefetch target indication section 3 attaches indication information, which indicates not a prefetch request issuance target, to as many memory access instructions in the sequences of instructions as the number of exceeding entries.

Then, at this point, the memory access instruction generation section 4 generates a software prefetch instruction related to a memory access instruction to which indication information, which indicates not a prefetch request issuance target, is attached and inserts the software prefetch instruction into an instruction sequence.

Here, FIG. 7 shows an example of content of address patterns held in the prefetch address queue 21 in accordance with indication information (hardware prefetch target indication).

First, when memory access requests arise to the access addresses A to C indicating hardware prefetch targets at times t1 to t3, the update section 25 successively registers address patterns A+1 to C+1 of the sequences A to C at the entries 0 to 2.

Subsequently, when memory access requests to the access addresses D and E indicating hardware prefetch non-targets arise at times t4 and t5, the access pattern monitoring section 22 inhibits comparison processing. Further, though the entry 3 is an invalid entry (empty entry), the update section 25 also inhibits registration of address patterns of the access addresses D and E in the prefetch address queue 21.

Similarly, the update section 25 does not register an address pattern of the access address F that arose at time t8 in the prefetch address queue 21, either.

On the other hand, the update section 25 performs update processing of address patterns for memory access requests of the sequences A and B that arose at times t6, t7, and t9. Moreover, prefetch requests are issued by the access pattern monitoring section 22, the primary cache prefetch request issuing section 23, or the secondary cache prefetch request issuing section 24.

FIG. 8 shows an example of content of address patterns held in the prefetch address queue 21 when a software prefetch instruction is executed by the instruction execution section 15.

As shown in FIG. 8, when software prefetch instruction of an access address D+8 is requested at time t5, the access pattern monitoring section 22 inhibits comparison processing of the access address D+8 because indication information thereof indicates a hardware prefetch non-target. Further, though the entry 3 is an invalid entry (empty entry), the update section 25 also inhibits registration of an address pattern of the access address D+8 in the prefetch address queue 21.

In FIG. 8, memory access requests to access addresses D, D+1, and D+9 indicating hardware prefetch non-targets are issued at times t4, t9, and t10 and also for these requests, comparison processing by the access pattern monitoring section 22 and registration processing by the update section 25 are inhibited.

According to the information processing unit 1 as an embodiment of the present invention, as described above, if the update section 25 causes the prefetch address queue 21 to hold (newly register) an address pattern or updates an address pattern in the prefetch address queue 21, overwrite processing on the address pattern is inhibited for a predetermined period.

Thus, a valid address pattern for which continuous access is identified, can be inhibited from being deleted by overwrite processing, like conventional LRU control, immediately after being registered or updated. That is, even if continuous access of a plurality of sequences exceeding the number of entries N+1 of the prefetch address queue 21 should occur, registered address patterns can reliably be prevented from being mutually overwritten by memory access of the plurality of sequences.

As a result, the prefetch address queue 21 can be used effectively and a prefetch request to continuous access can be issued efficiently. That is, effective performance improvement such as hiding of cache miss latency and throughput improvement can be achieved by a prefetch.

More specifically, the update section 25 recognizes, as the predetermined period, that the value of the counter 21a counting the number of clock cycles after address information being held or updated reaches a predetermined value. Therefore, overwrite processing of the address pattern of the corresponding entry by the update section 25 is inhibited until a predetermined number of clock cycles is counted by the counter 21a so that the above effect can reliably be achieved.

The prefetch target indication section 3 attaches indication information, which indicates whether or not the memory access instruction is a hardware prefetch request issuance target, to a memory access instruction and the hardware prefetch control device 20 performs the comparison processing and issuance processing of a prefetch request based on the indication information. Therefore, whether or not to cause a hardware prefetch to perform can be determined from the compile section 2 side, that is, the software prefetch side so that the software prefetch and hardware prefetch can be made consistent with efficiency.

That is, a software prefetch and a hardware prefetch being performed to the same memory access instruction can reliably be inhibited by generation of a software prefetch instruction related to a memory access instruction to which indication information, which indicates a prefetch request issuance target, is attached by the prefetch target indication section 3 being inhibited by the memory access instruction generation section 4. As a result, the same prefetch request will not be issued from both the software prefetch side and hardware prefetch side so that issuance of redundant prefetch request can reliably be inhibited.

More specifically, when continuous access of a plurality of sequences occurs at the same time, the prefetch target indication section 3 attaches indication information in accordance with the number of entries N+1 that can be held by the prefetch address queue 21. Therefore, processing in accordance with the hardware configuration of the hardware prefetch control device 20 can be performed so that the prefetch address queue 21 can be used more effectively and also a prefetch request with respect to continuous access can be made more efficient.

That is, if the number of sequences of instructions causing continuous access at the same time exceeds the number of entries N+1, the prefetch target indication section 3 attaches indication information, which indicates not a prefetch request issuance target, to as many memory access instructions in the sequences of instructions as the number of exceeding entries. Then, the memory access instruction generation section 4 generates a software prefetch instruction related to a memory access instruction to which indication information, which indicates not a prefetch request issuance target, is attached and inserts the software prefetch instruction into an instruction sequence. Therefore, an occurrence of registration processing of the number of address patterns exceeding the number of entries N+1 of the prefetch address queue 21 can be inhibited to a minimum. Moreover, a portion of sequences of instructions exceeding the number of entries N+1 can reliably be protected by the software prefetch so that a prefetch request can be issued more reliably and efficiently. Furthermore, prefetch requests in charge are shared between the hardware prefetch and software prefetch so that the hardware prefetch and software prefetch can be made consistent with efficiency.

[2] Others

The present invention is not limited to the above embodiment and can be carried out in various modifications without deviating from the spirit of the present invention.

For example, the above embodiment is described by taking a case in which two cache systems (the caches 12 and 13) are provided between the processor unit 10 and the main storage device 11 as an example. However, the present invention is not limited to this and at least one cache memory provided between the processor unit 10 and the main storage device 11 is sufficient.

Also, the above embodiment is described by taking a case in which the hardware prefetch control device 20 monitors memory access requests to the primary cache 12 of the processor unit 10 as an example. That is, the above embodiment is described by taking a case in which the access pattern monitoring section 22 acquires a memory access request to the primary cache 12 of the processor unit 10 and indication information thereof and performs comparison processing as an example. However, the present invention is not limited to this and the access pattern monitoring section 22 may monitor memory access requests of the primary cache 12 to the secondary cache 13 in accordance with specifications of the information processing unit 1. Or, the access pattern monitoring section 22 may monitor memory access requests of the secondary cache 13 to the main storage device 11.

Further, the above embodiment is described using a case which includes a feature whereby the compile-section 2 of the processor unit 10 is provided with the prefetch target indication section 3 and processing related to a prefetch is performed based on target indications and another feature whereby the update section 25 performs overwrite inhibition processing for a predetermined period based on the counter 21a as an example. However, the present invention need not necessarily include these two features simultaneously and may include one of the two features.

Also, the above embodiment is described by taking a case in which the counter 21a counts the number of clock cycles as an example. However, the present invention is not limited to this and, for example, as a modification of the present embodiment, the counter 21a may count the number of times of inhibiting overwrite processing by the update section 25 on an address pattern after the address pattern is held at the corresponding entry 0 to N or updated.

In this case, the update part 25 recognizes, as a predetermined period in which overwrite processing is inhibited, that the counter value reaches a predetermined value. That is, the update section 25 inhibits overwrite processing of the corresponding entry until overwrite processing is inhibited a predetermined number of times.

Figure 9:
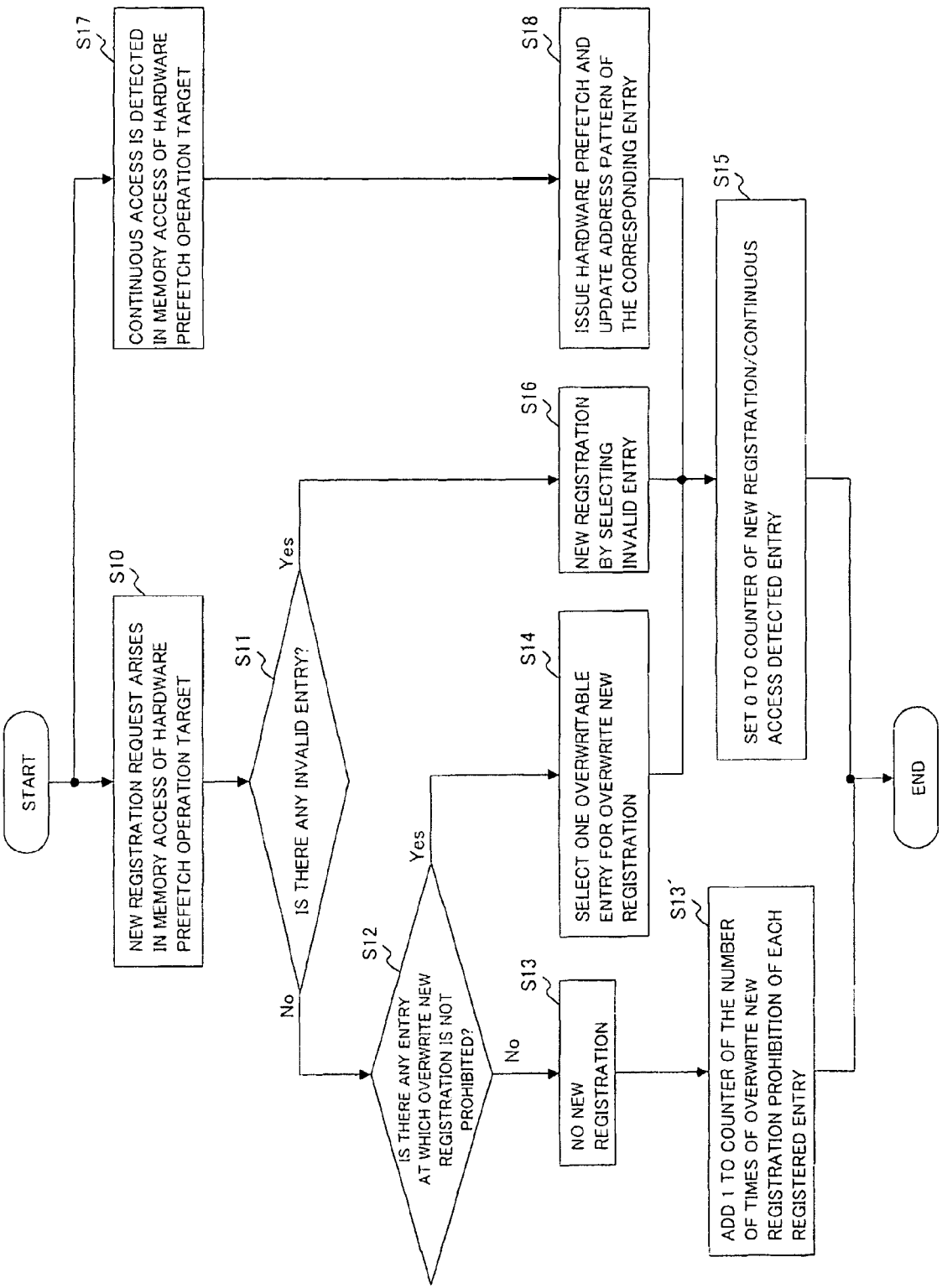
FIG. 9 is a flow chart exemplifying the operation procedure for the prefetch address queue update section of the hardware prefetch control device of the information processing unit as a modification.

The processing procedure of the update section 25 in this case is shown as a flow chart (steps S10 to S18, S13') in FIG. 9. In FIG. 9, the same numerals as those in FIG. 4 indicate the same processing or substantially the same processing as those in FIG. 4 and thus, a detailed description thereof is omitted here.

As shown in FIG. 9, when the update section 25 does not perform new registration at step S13, that is, overwrite processing on registered address patterns is inhibited, the counter control section 26 adds 1 to the counter (number of times of prohibiting overwrite processing) of each of the registered entries (step S13').

Accordingly, the same operation effect as that in the above embodiment can also be achieved.

Also, the above embodiment is described by taking a case in which when the counter control section 26 resets the counter 21a, the counter 21a is reset to 0 regardless of the type of the entries 0 to N as an example. However, the present invention is not limited to this and, for example, the update section 25 may set a predetermined period for an address pattern updated in the prefetch address queue 21 longer than that for an address pattern newly held by the prefetch address queue 21.

More specifically, for example, if inhibition control of overwrite processing of the update section 25 is canceled when the value of the counter 21a is 8, and a new address pattern is registered, the counter control section 26 resets the value to 4. If, on the other hand, continuous access is detected and an address pattern is updated, the counter control section 26 resets the counter value to 0.

Accordingly, the update section 25 sets a predetermined period for an updated address pattern longer than that for an address pattern newly held by the prefetch address queue 21.

Thus, control can be exercised to cause the prefetch address queue 21 to preferentially hold an address pattern belonging to continuous accesses, by setting an overwrite processing inhibition period of an address pattern, which is updated and belonging to continuous accesses, longer than that of a newly registered address pattern. As a result, a prefetch request can be issued more reliably, contributing to performance improvement of the processor unit 10, that is, hiding of cache miss latency and throughput improvement.

Further, the above embodiment is described by taking a case in which when continuous access of the number of sequences exceeding the number of entries N+1 of the prefetch address queue 21 occurs, the prefetch target indication section 3 performs a software prefetch. However, the present invention is not limited to this and, for example, if the distance (here, spacing to the next cache line) of prefetch by the hardware prefetch control device 20 is inappropriate and the distance is too long/short, that is, the distance is outside a predetermined range, the prefetch target indication section 3 may attach indication information indicating that a memory access instruction of the sequence is not a prefetch request issuance target. Then, at this point, the memory access instruction generation section 4 generates a software prefetch instruction of the memory access instruction.

That is, in the hardware prefetch control device 20, the specification for a prefetch distance between the access address and an address of the cache line to be prefetched is limited by the algorithm implemented in the circuit and the degree of design change is low.

On the other hand, the distance of prefetch in the software prefetch can be changed in various ways and therefore, if the distance of hardware prefetch by the hardware prefetch control device 20 is not within a predetermined range and neither the cache hit rate nor throughput is improved after performing a hardware prefetch, the hardware prefetch is stopped and instead, the prefetch is performed at an optimal prefetch distance based on the software prefetch.

That is, it is determined whether or not a hardware prefetch effect such as the cache hit rate and throughput exceeding a predetermined value is obtained from the hardware prefetch by the hardware prefetch control device 20. If it is determined that a hardware prefetch effect exceeding a predetermined value is not obtained, the prefetch target indication section 3 attaches indication information, which indicates not a hardware prefetch request issuance target, to the relevant memory access instruction. Further, the memory access instruction generation section 4 generates a software prefetch instruction related to the memory access instruction and inserts the software prefetch instruction into an instruction sequence.

On the other hand, if it is determined that a hardware prefetch effect exceeding a predetermined value is obtained, the prefetch target indication section 3 continues to perform hardware prefetches and the memory access instruction generation section 4 generates no software prefetch instruction related to the memory access instruction. That is, the prefetch target indication section 3 attaches indication information, which indicates a hardware prefetch request issuance target, to the relevant memory access instruction.

Accordingly, the operation effect in the above embodiment can be obtained more reliably.

The hardware prefetch effect may be determined by an operator of the information processing unit 1 using various kinds of existing methods or automatically.

Moreover, a portion or all of the processing by the compile section 2 in the above modification and one embodiment may be realized by a programmer.

Functions of the compile section 2, the counter 21a, the access pattern monitoring section 22, the primary cache prefetch request issuing section 23, the secondary cache prefetch request issuing section 24, and the prefetch address queue update section 25 described above may be realized by a predetermined application program (prefetch control program) being executed by a computer (including a CPU, information processing unit, and various terminals).

The program is provided in a form of a computer readable recording medium such as a flexible disk, CD (such as CD-ROM, CD-R, and CD-RW), and DVD (such as DVD-ROM, DVD-RAM, DVD-R, DVD-RW, DVD+R, and DVD+RW) in which the program is recorded. In this case, the computer reads the prefetch control program from the recording medium and transfers and stores the program in an internal storage device or external storage device before using the program. The program may also be provided to the computer via a communication path from a storage device (recording medium) such as a magnetic disk, optical disk, and magneto-optical disk after storing the program in the storage device.

Here, the computer is a concept including hardware and an operating system (OS) and means hardware operating under control of the OS. If the OS is not needed and an application program alone operates hardware, the hardware itself corresponds to a computer. Hardware includes at least a microprocessor such as a CPU and a means for reading computer programs recorded in a recording medium.

The application program as the prefetch control program includes program code to cause the aforementioned computer to realize functions as the compile section 2, the counter 21a, the access pattern monitoring section 22, the primary cache prefetch request issuing section 23, the secondary cache prefetch request issuing section 24, and the prefetch address queue update section 25. A portion of the functions may be realized by the OS instead of the application program.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that various changes, substitutions, and alterations could be made hereto without departing from the spirit and scope of the invention.

What is claimed is:

1. An information processing unit, comprising:
   an instruction execution section executing a memory access instruction;
   a storage section holding data related to the memory access instruction executed by the instruction execution section;
   at least one cache memory provided between the instruction execution section and the storage section;
   an address information holding section holding first address information based on an address of the memory access instruction executed by the instruction execution section;
   a hardware prefetch request issuing section issuing a hardware prefetch request to the cache memory based on a result of comparison processing between an address requested by the instruction execution section for memory access and the first address information held in the address information holding section;
   a hardware prefetch target indication section that attaches indication information, which indicates whether or not the memory access instruction is a hardware prefetch request issuance target by the hardware prefetch request issuing section, to the memory access instruction; and
   a control section controlling content of the first address information held by the address information holding section based on the result of the comparison processing, wherein
   the hardware prefetch request issuing section performs the comparison processing and issuance processing of a hardware prefetch request based on the indication information; and
   when the address information holding section is caused to hold the first address information or when the first address information in the address information holding section is updated, until a predetermined period elapses after the first address information is held or updated, the control section inhibits overwrite processing on the first address information with second address information which belongs to second sequence different from first sequence to which the first address information belongs, while permits updating processing on the first address information held in the address information holding section.

2. The information processing unit according to claim 1, further comprising a counter counting a number of clock cycles after the first address information is held or updated, wherein
   the control section recognizes, as the predetermined period, that a value of the counter reaches a predetermined value.

3. The information processing unit according to claim 1, further comprising a counter counting a number of times of inhibiting the overwrite processing by the control section on the first address information after the first address information is held or updated, wherein
   the control section recognizes, as the predetermined period, that a value of the counter reaches a predetermined value.

4. The information processing unit according to claim 1, further comprising a counter counting a number of clock cycles after the first address information is held or updated, wherein the control section recognizes the value of counter after the first address information is held reaching a first predetermined period as the predetermined period while recognizes the value of counter after the first address information is updated reaching a second predetermined period larger than the first predetermined period as the predetermined period.

5. An information processing unit, comprising:
   an instruction execution section executing a memory access instruction;

a storage section holding data related to the memory access instruction executed by the instruction execution section;

at least one cache memory provided between the instruction execution section and the storage section;

an address information holding section holding address information based on an address of the memory access instruction executed by the instruction execution section;

a hardware prefetch request issuing section issuing a hardware prefetch request to the cache memory based on a result of comparison processing between an address requested by the instruction execution section for memory access and the address information held in the address information holding section; and a hardware prefetch target indication section that attaches indication information, which indicates whether or not the memory access instruction is a hardware prefetch request issuance target by the hardware prefetch request issuing section, to the memory access instruction, wherein the hardware prefetch request issuing section performs the comparison processing and issuance processing of the hardware prefetch request based on the indication information; and when continuous access of a plurality of sequences occurs, the hardware prefetch target indication section attaches the indication information in accordance with a number of entries of address information that can be held by the address information holding section.

6. The information processing unit according to claim 5, wherein the hardware prefetch request issuing section performs the comparison processing and issuance processing of the hardware prefetch request when the indication information indicates the hardware prefetch request issuance target, and inhibits execution of the comparison processing and issuance processing of the hardware prefetch request when the indication information indicating not the hardware prefetch request issuance target.

7. The information processing unit according to claim 5, further comprising a memory access instruction generation section generating a software prefetch instruction related to the memory access instruction to insert the software prefetch instruction into an instruction sequence, wherein the memory access instruction generation section inhibits generation of the software prefetch instruction related to the memory access instruction to which the indication information, which indicates the hardware prefetch request issuance target, is attached by the hardware prefetch target indication section.

8. The information processing unit according to claim 5, wherein when the number of sequences of instructions causing the continuous access is larger than the number of entries, the hardware prefetch target indication section attaches the indication information, which indicates not the hardware prefetch request issuance target, to as many the memory access instructions in the sequences of instructions as the number of exceeding entries and the memory access instruction generation section generates a software prefetch instruction related to the memory access instruction to which the indication information, which indicates not the hardware prefetch request issuance target, is attached and inserts the software prefetch instruction into an instruction sequence.

9. A non-transitory computer-readable recording medium in which a program causing a computer to realize a function to perform a prefetch to cache memories in an information processing unit having an instruction execution section executing a memory access instruction, a storage section holding data related to the memory access instruction executed by the instruction execution section, at least one cache memory provided between the instruction execution section and the storage section, and an address information holding section holding first address information based on an address of the memory access instruction executed by the instruction execution section is stored, wherein the program causes the computer to function as a hardware prefetch request issuing section issuing a hardware prefetch request to the cache memory based on a result of comparison processing between an address requested by the instruction execution section for memory access and the first address information held in the address information holding section a hardware prefetch target indication section that attaches indication information, which indicates whether or not the memory access instruction is a hardware prefetch request issuance target by the hardware prefetch request issuing section, to the memory access instruction and a control section controlling content of the first address information held by the address information holding section based on the result of the comparison processing, and the program causes the computer to function in such a way that when the address information holding section is caused to hold the first address information or when the first address information in the address information holding section is updated, until a predetermined period elapses after the first address information is held or updated, the control section inhibits overwrite processing on the first address information with second address information which belongs to second sequence different from first sequence to which the first address information belongs, while permits updating processing on the first address information held in the address information holding section.

10. A non-transitory computer-readable recording medium in which a program causing a computer to realize a function to perform a prefetch to cache memories in an information processing unit having an instruction execution section executing a memory access instruction, a storage section holding data related to the memory access instruction executed by the instruction execution section, at least one cache memory provided between the instruction execution section and the storage section, an address information holding section holding address information based on an address of the memory access instruction executed by the instruction execution section, and a hardware prefetch request issuing section issuing a hardware prefetch request to the cache memory based on a result of comparison processing between an address requested by the instruction execution section for memory access and the address information held in the address information holding section is recorded, wherein the program causes the computer to function as a hardware prefetch target indication section that attaches indication information, which indicates whether or not the memory access instruction is a hardware prefetch request issuance target by the hardware prefetch request issuing section, to the memory access instruction and the computer is caused to function in such a way that when continuous access of a plurality of sequences occurs, the hardware prefetch target indication section attaches the indication information in accordance with a number of entries of address information that can be held by the address information holding section.

11. The recording medium according to claim 10, wherein the computer is caused to function as a memory access instruction generation section generating a software prefetch instruction related to the memory access instruction to insert the software prefetch instruction into an instruction sequence and the computer is caused to function in such a way that the memory access instruction generation section inhibits generation of the software prefetch instruction related to the memory access instruction, to which the indication information indicating the hardware prefetch request issuance target is attached by the hardware prefetch target indication section, and also generates the software prefetch instruction related to the memory access instruction, to which the indication information indicating not the hardware prefetch request issuance target is attached, to insert the software prefetch instruction into the instruction sequence.

12. The recording medium according to claim 10, wherein the computer is caused to function in such a way that when continuous access of the plurality of sequences occurs, the hardware prefetch target indication section attaches the indication information, which indicates the hardware prefetch request issuance target, to the memory access instructions within a range of the number of entries and, when the number of entries is exceeded, the hardware prefetch target indication section attaches the indication information, which indicates not the hardware prefetch request issuance target, to as many the memory access instructions of sequences of instructions as the number of exceeding entries.

13. An instruction sequence generation method of generating an instruction sequence in an information processing unit having an instruction execution section executing a memory access instruction, a storage section holding data related to the memory access instruction executed by the instruction execution section, at least one cache memory provided between the instruction execution section and the storage section, an address information holding section holding address information based on an address of the memory access instruction executed by the instruction execution section, and a hardware prefetch request issuing section issuing a hardware prefetch request to the cache memory based on a result of comparison processing between an address requested by the instruction execution section for memory access and the address information held in the address information holding section, wherein indication information, which indicates whether or not the memory access instruction is a hardware prefetch request issuance target by the hardware prefetch request issuing section, is attached to the memory access instruction in accordance with a number of entries of the address information that can be held by the address information holding section and while a software prefetch instruction related to the memory access instruction, to which the indication information indicating not the hardware prefetch request issuance target is attached, is generated to insert the software prefetch instruction into the instruction sequence, generation of the software prefetch instruction related to the memory access instruction, to which the indication information indicating the hardware prefetch request issuance target is attached, is inhibited.

14. The instruction sequence generation method according to claim 13, wherein when continuous access of a plurality of sequences occurs, the indication information, which indicates the hardware prefetch request issuance target, is attached to the memory access instructions within a range of the number of entries and, when the number of entries is exceeded, the indication information, which indicates not the hardware prefetch request issuance target, is attached to as many the memory access instructions as the number of exceeding entries.

15. The instruction sequence generation method according to claim 13, wherein whether or not a hardware prefetch effect equal to or higher than a predetermined level is obtained by a hardware prefetch by the hardware prefetch request issuing section is determined and if it is determined that the hardware prefetch effect equal to or higher than the predetermined level is not obtained, the indication information, which indicates not the hardware prefetch request issuance target, is attached to the memory access instruction and a software prefetch instruction related to the memory access instruction is generated.

\* \* \* \* \*